United States Patent [19]

Throckmorton et al.

[11] 4,424,324

[45] Jan. 3, 1984

[54] PROCESS FOR NONAQUEOUS DISPERSION POLYMERIZATION OF BUTADIENE

[75] Inventors: Morford C. Throckmorton, Akron; Charles J. Suchma, North Royalton, both of Ohio

[73] Assignee: The Goodyear Tire & Rubber Company, Akron, Ohio

[21] Appl. No.: 448,120

[22] Filed: Dec. 9, 1982

[51] Int. Cl.³ .............................................. C08F 2/08
[52] U.S. Cl. .................................................... 526/220
[58] Field of Search ......................................... 526/220

[56] References Cited

U.S. PATENT DOCUMENTS 4,098,980 7/1978 Markle ................................. 526/201

*Primary Examiner*—Paul R. Michl
*Attorney, Agent, or Firm*—Alvin T. Rockhill

[57] ABSTRACT

This invention discloses a process for the nonaqueous dispersion polymerization of butadiene monomer in a reaction mixture containing a liquid nonaqueous dispersion medium, a catalyst system, butadiene monomer, and at least one polymeric dispersing agent, the improvement which comprises carrying out the polymerization of the butadiene monomer in the presence of the reaction product of (1) an alkylbenzene sulfonic acid wherein said alkyl moiety contains from 6 to 20 carbon atoms and (2) a polyalkylene amine that contains from 6 to 20 carbon atoms and 2 to 8 amine moieties. The presence of a small amount of this reaction product very substantially reduces the amount of polymeric dispersing agent needed in such a polymerization.

18 Claims, No Drawings

1

PROCESS FOR NONAQUEOUS DISPERSION POLYMERIZATION OF BUTADIENE

BACKGROUND OF THE INVENTION

Many polymerization processes are used in the formation of synthetic polymers. For example, the polymerization of a polymer can be conducted in a number of different types of reaction systems, including bulk polymerization, suspension polymerization, emulsion polymerization, and solution polymerization. Each of these systems has certain advantages and disadvantages.

Bulk polymerization is the direct conversion of liquid monomers to polymer in a reaction system in which the polymer remains soluble in its own monomer. Such bulk polymerizations are generally carried out by the addition of an initiator to a simple homogeneous system containing one or more monomers. The synthesis of polystyrene by the addition of a free radical initiator to styrene monomer is a good example of a very common bulk polymerization. The principal advantage of a bulk polymerization process is that the product obtained can be used directly since it is essentially free of solvents and impurities. One disadvantage of bulk polymerization reactions is that it is difficult to control the reaction temperature during polymerization.

In suspension polymerization, the initiator is dissolved in the monomer, the monomer is dispersed in water, and a dispersing agent is incorporated to stabilize the suspension formed. All suspension polymerization processes use some type of surfactant to keep the monomer globules dispersed during the reaction in order to avoid coalescence and agglomeration of the polymer. Not only does the suspension stabilizer affect the particle size and shape, but also the clarity, transparency and film-forming properties of the resultant polymer. A variety of dispersing agents including water-insoluble, finely divided, inorganic materials and organic materials, depending upon the monomer to be polymerized, have been used as dispersing agents. Thus, for example, talc, barium, calcium and magnesium carbonates, silicates, phosphates and sulfates, as well as poly(vinyl alcohol), tragacanth gum, salts of styrene-maleic anhydride copolymers, vinyl acetate-maleic anhydride copolymers and their salts, starch, gelatin, pectin, alginates, methyl cellulose, carboxymethyl-cellulose, bentonite, limestone and alumina have been used as suspending agents. A major advantage of suspension polymerization is that the polymeric products are obtained in the form of small beads which are easily filtered, washed and dried. For reasons of cost and unreactivity, water is a much more desirable diluent and heat-transfer medium than most organic solvents.

However, in certain polymerization processes, for example, the preparation of very high cis-1,4-polybutadiene, while utilizing nickel catalyst systems the presence of any moisture is highly undesirable. Thus, suspension polymerization in a water medium is not an effective process for the synthesis of very high cis-1,4-polybutadiene utilizing nickel catalyst systems.

An emulsion polymerization process is considered to be a three-phase reaction system consisting of large droplets of the monomer, the aqueous phase containing the dissolved initiator, and the colloidal particles of monomer-swollen polymer. While the emulsion polymerization process has the economic advantage of using water as the emulsion base, not all polymerization processes can tolerate the presence of water.

Such is the case with the polymerization of butadiene into very high cis-1,4-polybutadiene utilizing nickel catalyst systems.

In solution polymerization, an organic solvent is used which is capable of dissolving the monomer, the polymer and the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and, at the same time, comprises a material which is easy to handle and does not agglomerate on the walls of the reaction vessel.

A process for the nonaqueous dispersion polymerization of butadiene monomer into a very high cis-1,4-polybutadiene would be very desirable. Such a nonaqueous dispersion polymerization process could offer several distinct advantages over other possible polymerization techniques, including improved heat transfer, higher polymer concentrations in the reaction medium, increased production capacity, and energy saving.

A process for the nonaqueous dispersion polymerization of butadiene monomer in a liquid nonaqueous dispersion medium, for instance, n-butane or n-pentane with a Ziegler-Natta catalyst which utilizes a block copolymer dispersion stabilizer is described in U.S. Pat. No. 4,098,980 to Richard A. Markle and Richard G. Sinclair (assigned to The Goodyear Tire & Rubber Company). This reference is hereby incorporated by reference in its entirety. The block copolymer dispersion stabilizer utilized in U.S. Pat. No. 4,098,980 is a copolymer which contains at least two blocks of polymer linked by chemical valences, at least one block (A block) is soluble in liquid organic dispersion medium and at least another block (B block) is insoluble in the dispersion medium and the stabilizer acts to disperse the polybutadiene which is formed in the stabilizer's presence.

Butadiene can also be polymerized into very high (95% or greater) cis-1,4-polybutadiene in a nonaqueous liquid dispersion medium utilizing at least one polymeric dispersing agent selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, butyl rubber, high cis-1,4-polyisoprene, and carbonylated polymers.

SUMMARY OF THE INVENTION

This invention discloses a process for the nonaqueous dispersion polymerization of butadiene monomer in a reaction mixture containing a liquid nonaqueous dispersion medium, a catalyst system, butadiene monomer, and at least one polymeric dispersing agent, the improvement which comprises carrying out the polymerization of the butadiene monomer in the presence of the reaction product of (1) an alkylbenzene sulfonic acid wherein said alkyl moiety contains from 6 to 20 carbon atoms and (2) a polyalkylene amine that contains from 6 to 20 carbon atoms and 2 to 8 amine moieties. The presence of a small amount of this reaction product very substantially reduces the amount of polymeric dispersing agent needed in such a polymerization.

In accordance with the present invention, a process is revealed for the nonaqueous dispersion polymerization of butadiene monomer in a liquid nonaqueous dispersion medium (1) utilizing at least one polymeric dispersing agent selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, butyl rubbers, high cis-1,4-polyisoprene, and carbonylated polymers and (2) at least one alkylbenzene sulfonic acid derivative which is the reaction product of (a) an alkylbenzene sulfonic acid wherein said alkyl moiety contains from 6 to 20 carbon atoms and (b) a polyalkylene amine that contains from 6 to 20 carbon atoms and 2 to 8 amine moieties as the dispersion stabilizer (dispersing agent) to produce very high cis-1,4-polybutadiene. By utilizing the alkylbenzene sulfonic acid derivatives described in this invention as codispersants in such a nonaqueous dispersion polymerization the total amount of dispersing agents needed can be reduced very substantially.

DETAILED DESCRIPTIONS

This invention discloses a process for the nonaqueous dispersion polymerization of butadiene monomer in a reaction mixture containing a liquid nonaqueous dispersion medium, a catalyst system, butadiene monomer, and at least one polymeric dispersing agent, the improvement which comprises carrying out the polymerization of the butadiene monomer in the presence of the reaction product of (1) an alkylbenzene sulfonic acid wherein said alkyl moiety contains from 6 to 20 carbon atoms and (2) a polyalkylene amine that contains from 6 to 20 carbon atoms and 2 to 8 amine moieties. The presence of a small amount of this reaction product very substantially reduces the amount of polymeric dispersing agent needed in such a polymerization.

This invention also discloses a process for the nonaqueous dispersion polymerization of butadiene monomer in a reaction mixture containing a liquid nonaqueous dispersion medium and at least one polymeric dispersing agent selected from the group consisting of cis-1,4-poly(1,3-pentadiene), trans-1,4-poly(1,3-pentadiene), trans-1,2-poly(1,3-pentadiene), poly(2,3-dimethyl-1,3-butadiene), butadiene/isoprene copolymers, butadiene/dimethylbutadiene/pentadiene terpolymers, styrene/1,3-pentadiene copolymers, and mixtures of from 20% to 65% 3,4-polyisoprene and from 35% to 80% 1,4-polyisoprene, EPDM rubbers, butyl rubbers, high cis-1,4-polyisoprene, and carbonylated polymers, the improvement which comprises carrying out the polymerization of the butadiene monomer in the presence of at least one alkylbenzene sulfonic acid derivative which is the reaction product of (1) an alkylbenzene sulfonic acid wherein said alkyl moiety contains from 6 to 20 carbon atoms and (2) a polyalkylene amine that contains from 6 to 20 carbon atoms and 2 to 8 amine moieties, as a codispersant, to produce very high cis-1,4-polybutadiene. Very high cis-1,4-polybutadiene contains 95% or more cis-1,4-isomeric butadiene units.

The nonaqueous medium in which this polymerization is run must be a very poor solvent for very high cis-1,4-polybutadiene. Some representative examples of nonaqueous media that can be employed in which the very high cis-1,4-polybutadiene is essentially insoluble include: n-butane, isobutane, n-pentane, isopentane, neopentane, 2-methylpentane, 2,2-dimethylbutane, 2,2-dimethylpentane, 2,4-dimethylpentane, 2,2,4-trimethylpentane, 2,2,3-trimethylbutane, isobutylene, 1-butene, 3-methyl-1-butene, trans-2-butene and any mixture of any or all of these nonaqueous media. Minor amounts of other hydrocarbons, which by themselves are solvents for very high cis-1,4-polybutadiene, can also be present in such a nonaqueous dispersion media; however, their presence is detrimental since even small amounts of solvent will cause swelling of the cis-1,4-polybutadiene and result in an increase in viscosity. The presence of large amounts of solvents for cis-1,4-polybutadiene will lead to the formation of a cement-like composition. Since it is desirable for these nonaqueous dispersions to have a very low viscosity it is advantageous to minimize the amount of solvents for cis-1,4-polybutadiene in the nonaqueous medium.

The liquid nonaqueous dispersion media should contain less than about 5% aromatic and cycloaliphatic hydrocarbons (which are good solvents for cis-1,4-polybutadiene) such as, benzene, toluene, cyclohexane, methylcyclohexane and the like. The nonaqueous medium must contain less than about 20% aliphatic hydrocarbons that are fair solvents for high cis-1,4-polybutadiene in order to be effective as a nonaqueous medium in the polymerization of high cis-1,4-polybutadiene. Some representative examples of such aliphatic hydrocarbons include: hexane, 3-methylpentane, 2,3-dimethylbutane, heptane, octane, 2,3-dimethylpentane, and 2,3,4-trimethylpentane.

Most olefins react too rapidly with the alkylaluminum catalysts that can be used in these polymerizations and/or are too good as solvents for the very high cis-1,4-polybutadiene to be useful as a nonaqueous dispersion media. Some olefins that are exceptions to this general rule include trans-2-butene, isobutylene, 1-butene and 3-methyl-1-butene which can be used with good success as nonaqueous dispersion media. Fluorohydrocarbons can also be used very successfully as the nonaqueous dispersion media for the synthesis of very high cis-1,4-polybutadiene. Some representative examples of fluorohydrocarbons that can be employed as the nonaqueous dispersion media include 1,1,1,2,2-pentafluoropropane, decafluorobutane, octafluorobutane and the like.

Several factors are important in selecting the preferred medium for the nonaqueous dispersion polymerization of very high cis-1,4-polybutadiene. If the medium has a very low boiling point, it is necessary to operate the system at a relatively high pressure and/or low temperature. If the medium has a relatively high boiling point, more energy is required to recover and/or remove the last traces of the medium from the polymer. Other things being equal, the dispersed particles will stay dispersed or suspended slightly better in a high density medium than it will in a medium having a relatively low density. One of the most important factors in selection of a preferred nonaqueous medium is the relative solvency of the medium for the very high cis-1,4-polybutadiene and for the dispersing agent.

The relative solvency factor is related to the solubility parameter, which is the square root of the cohesive energy density, that is, $$\text{Solubility parameter} = \sqrt{\frac{\Delta E}{V}}$$

where E is internal energy and V is the molar volume. A good medium in which to conduct nonaqueous polymerization of butadiene to very high cis-1,4-polybutadiene should have a solubility parameter between about 6 and about 7 (cal/cc)$^{\frac{1}{2}}$. The solubility parameter values are as reported by Kenneth L. Hoy in "New Values of the Solubility Parameters From Vapor Pressure Data." *Journal of Paint Technology*, vol. 42, no. 541, pp. 76–118 (1970). This article is incorporated herein by reference in its entirety.

The preferred media are n-butane, n-pentane, isopentane, 2-methylpentane, 2,2-dimethylpentane, 2,2,4-trimethylpentane, and any mixtures of two or more of these media.

In order to practice this nonaqueous dispersion polymerization a combination of (1) a polymeric dispersing agent and (2) the reaction product of (a) an alkylbenzene sulfonic acid wherein said alkyl moiety contains from 6 to 20 carbon atoms and (b) a polyalkylene amine that contains from 6 to 20 carbon atoms and from 2 to 8 amine moieties can be used as the dispersion stabilizer.

A polymeric dispersing agent selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, butyl rubbers, high cis-1,4-polyisoprene and carbonylated polymers; and at least one alkylbenzene sulfonic acid derivative which is the reaction product of (1) an alkylbenzene sulfonic acid wherein said alkyl moiety contains from 6 to 20 carbon atoms and (b) a polyalkylene amine that contains from 6 to 20 carbon atoms and from 2 to 8 amine moieties, can be employed as codispersants in this nonaqueous dispersion polymerization of butadiene into very high cis-1,4-polybutadiene. The amount of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, butyl rubbers, high cis-1,4-polyisoprene, and carbonylated polymers which should be present in order to produce good nonaqueous dispersions for very high cis-1,4-polybutadiene in this invention can range between about 0.1 and about 4.0 phm (parts by weight per 100 parts of butadiene monomer used in the polymerization).

In moderately high trans-1,4-polyisoprene between 50% and 80% of the isoprene units in the polymer have the trans-1,4-isomeric structure. The remaining isoprene units in the polymer can be atactic or have the cis-1,4-isomeric structure. If over 90% of the isoprene units in the polymer have the trans-1,4-isomeric structure it will be insoluble in the nonaqueous dispersion medium and unsatisfactory as a dispersing agent. If 80% to 90% of the isoprene units in the polymer have the trans-1,4-isomeric structure it will be only marginally soluble in the nonaqueous dispersion medium and of very limited value as a nonaqueous dispersing agent.

The mixtures of 3,4-polyisoprene and 1,4-polyisoprene that are useful as dispersing agents must contain between 20% and 65% 3,4-polyisoprene and between 35% and 80% 1,4-polyisoprene. The 1,4-polyisoprene in such mixtures can be atactic, or it can have either a cis- or trans-1,4-isomeric structure. The 1,4-polyisoprene component in such mixtures can have any combination of mixed microstructures. It is generally preferred for these mixtures of 3,4-polyisoprene and 1,4-polyisoprene to contain about 50% 3,4-polyisoprene and about 50% 1,4-polyisoprene. Cis-1,4-poly(1,3-pentadiene), trans-1,4-poly(1,3-pentadiene), and trans-1,2-poly(1,3-pentadiene) can all be used as polymeric dispersing agents for very high cis-1,4-polybutadiene. The poly(2,3-dimethyl-1,3-butadiene) that is useful as a dispersing agent in this invention should be atactic, as found in polymers which have a random mixture of microstructures. Either syndiotactic or atactic 1,2-polybutadiene can be used as the polymeric dispersing agent in this invention.

Butadiene-isoprene copolymers, butadiene-dimethylbutadiene-pentadiene terpolymers, and styrene-1,3-pentadiene copolymers can also be used as dispersing agents in these polymerizations. The microstructure of these copolymers and terpolymers is not of importance. The copolymers of styrene and 1,3-pentadiene that are useful as polymeric dispersing agents have 0 to 50% of their repeat units being derived from styrene. It is preferred for these copolymers to have from 10% to 30% of their repeat units being derived from styrene.

The butadiene/isoprene copolymers and butadiene/dimethylbutadiene/pentadiene terpolymers that are useful as polymeric dispersing agents in this invention can have any ratio of repeat units being derived from these different monomers. However, a significant amount (about 5% or more) of repeat units by weight must be derived from each of the different monomer components of the polymer.

The EPDM rubbers that are useful in this invention include: ethylene/propylene/dicyclopentadiene terpolymers, ethylene/propylene/ethylidene norbornene terpolymers, ethylene/propylene/methylene norbornene terpolymers, ethylene/propylene/1,4-hexadiene terpolymers, ethylene/propylene/5-methyl-1,4-hexadiene terpolymers, ethylene/propylene/vinyl norbornene terpolymers, ethylene/propylene/1,4,9-decatriene terpolymers, and the like. In such EPDM rubbers between about 1.5% and 15% by weight of the repeat units are unsaturated (derived from nonconjugated diolefins). From about 40% to 70% by weight of the polymer's repeat units are derived from ethylene and about 30% to 70% by weight of the polymers repeat units are derived from propylene in such EPDM rubbers. It is preferred for 2.5% to 8% by weight of the repeat units to be unsaturated, for 45 to 55% by weight of the repeat units to be derived from ethylene, and for 35% to 50% by weight of the repeat units to be derived from propylene.

The butyl rubbers that can be employed as polymeric dispersing agents include: isoprene/isobutylene copolymers, isoprene/isoamylene copolymers, butadiene/isobutylene copolymers, and the like. These polymers are generally comprised of about 80% to 99% by weight of the olefinic component while the remaining portion of the copolymer is comprised of the conjugated diolefinic component. It is preferred for such butyl rubbers to be comprised of 95% to 99% by weight of the olefinic component and 1% to 5% by weight of the conjugated diolefinic component.

The high cis-1,4-polyisoprene that is useful as a polymeric dispersing agent in this invention has at least 70% of its isoprene units in the cis-1,4-isomeric structures. It is preferred to employ very high cis-1,4-polyisoprene as the dispersing agent in these nonaqueous polymerizations. In very high cis-1,4-polyisoprene at least 95% of the isoprene units in the polymer have the cis-1,4-isomeric structure.

High cis-1,4-polyisoprene from a number of sources can be used as a dispersing agent. Both synthetic and naturally occurring high cis-1,4-polyisoprenes will function as nonaqueous dispersing agents in this polymerization process. For example, high cis-1,4-polyisoprene prepared utilizing alkyllithium catalysts, such as butyllithium, can be employed. Some representative examples of some commercially available very high cis-1,4-polyisoprenes include Natsyn TM 200 and Natsyn TM 2200 (marketed by The Goodyear Tire & Rubber Company). Some representative examples of natural high cis-1,4-polyisoprene rubbers that can be used as nonaqueous dispersing agents in this polymerization process include *Clitandra orientalis, Ficus elastica,* Landolphia species, *Parthenium argentatum* (guayule), *Hevea brasilienis,* and the like.

The carbonylated polymers which are useful as the dispersing agents in these nonaqueous polymerizations include copolymers and terpolymers of alpha-olefins and conjugated diolefins and/or nonconjugated diolefins; and homopolymers, copolymers and terpolymers of conjugated diolefins and/or nonconjugated diolefins. Some representative examples of carbonylated polymers that can be employed as dispersing agents in nonaqueous polymerizations include: carbonylated 1-butene/1-hexene/1,4-hexadiene terpolymers, carbonylated propylene/1-hexene/dicyclopentadiene terpolymers, carbonylated 1-butene/1-octene/1,4-hexadiene terpolymers, carbonylated 1-hexene/5-methyl-1,4-hexadiene copolymers, carbonylated 1-hexene/trans-1,4-hexadiene copolymers, carbonylated polybutadiene, carbonylated polyisoprene, carbonylated polypiperylene, carbonylated butadiene/isoprene copolymers, carbonylated butadiene/piperylene copolymers, carbonylated poly(5-methyl-1,4-hexadiene), and the like. These carbonylated polymers should contain about one carbonyl group for every 5 to 100 carbon atoms in the polymer.

Carbonylated EPDM's are the preferred carbonylated polymers for use as dispersing agents in this invention. These carbonylated EPDM's are oxidized high molecular weight amorphous terpolymers of ethylene, propylene, and a nonconjugated diene with the residual unsaturated portion of the diene in a pendant side chain.

The number of carbonyl groups in these carbonylated EPDM's should be between about one per every 8 carbon atoms in the backbone of the polymer chain and about one per every 80 carbon atoms in the backbone of the polymer chain. The carbonylated EPDM polymers preferably will contain from about 30 to about 75 weight percent ethylene, from about 25 to about 60 weight percent propylene, and from about 2 to about 25 weight percent of the nonconjugated diene termonomer which provides the residual unsaturation. The carbonylated EPDM more preferably will contain about 45 to about 65 weight percent ethylene, about 35 to about 50 weight percent propylene, and about 3 to about 12 weight percent of the nonconjugated diene termonomer. This will usually result in about one double bond for every 30 to 300 carbon atoms in the polymer depending on the amount and type of nonconjugated diene termonomer utilized. Some examples of the most widely used and satisfactory nonconjugated diene termonomers include 1,4-hexadiene, dicyclopentadiene, methylene norbornene, and ethylidene norbornene.

The carbonylated EPDM's that are useful as dispersing agents in this invention can be prepared by the controlled oxidation of commercially available EPDM's. This carbonylation procedure is known to those skilled in the art and is outlined in U.S. Pat. Nos. 3,864,268 and 4,011,380 which are herein incorporated by reference in their entirety.

Insignificant amounts (about 5% or less by weight) of other monomers can also be copolymerized into the polymeric dispersing agents described in this invention without totally losing the usefulness of these polymers as nonaqueous dispersing agents for very high cis-1,4-polybutadiene. For example, a terpolymer of butadiene, isoprene, and 2-ethyl-(1,3-butadiene) containing only an insignificant amount of repeat units derived from 2-ethyl-(1,3-butadiene) and which contains predominantly repeat units derived from butadiene and isoprene will be useful as a dispersing agent in this invention. The polymeric dispersing agents described in this invention can generally also be mildly halogenated and will still be useful in such polymerizations of butadiene into a very high cis-1,4-polybutadiene.

The number average molecular weight of the carbonylated EPDM's useful in this invention should be at least about 5000. Carbonylated EPDM's with number average molecular weights of about 10,000 to 200,000 are preferred as polymeric dispersing agents. The other polymeric dispersing agents that are useful in this invention have number average molecular weights ranging from about 50,000 to about 1,000,000. Polymers with number average molecular weights of over 1,000,000 can generally also be employed but normally their solubility in the nonaqueous dispersion medium is not as good.

The reaction products that are useful in this invention can be prepared by reacting alkylbenzene sulfonic acids with polyalkylene amines. The alkyl moiety in such alkylbenzene sulfonic acids must contain from 6 to 20 carbon atoms and the polyalkylene amines must contain from 2 to 20 carbon atoms and from 2 to 8 amine moieties. Some representative examples of polyalkylene amines that can be reacted with alkylbenzene sulfonic acids to produce alkylbenzene sulfonic acid derivatives which are effective in carrying out the teachings of this invention include diethylene triamine, triethylene tetramine, tetraethylene pentamine, pentaethylene hexamine, propylene diamine, tripropylene tetramine, 4,7-diazadecane-1,10-diamine, 3-azahexane-1,6-diamine, and the like. This reaction can be conducted at any temperature ranging between about 10° C. and about 90° C. for periods of time ranging between about 15 minutes and about 6 hours. This reaction is preferably conducted in the presence of the polymeric codispersant that will be employed in the nonaqueous dispersion polymerization. The molar ratio of the alkylbenzene sulfonic acid utilized in this reaction to the polyalkylene amine can range from about 0.5:1 to about 20:1. It is preferred for the molar ratio of the alkylbenzene sulfonic acid utilized in this reaction to the polyalkylene amine to be in the range from 1:1 to 10:1.

The reaction mixture utilized in the nonaqueous dispersion polymerization of butadiene to produce a very high cis-1,4-polybutadiene is comprised of a liquid nonaqueous dispersion medium, at least one polymeric dispersing agent, at least one alkylbenzene sulfonic acid derivative, butadiene monomer, and a catalyst system. Such a polymerization can be run over a temperature range from 0° up to 100° C. Most generally, it is preferred to utilize a reaction temperature from 35° C. to 70° C. The reaction time required in such a polymerization will vary with the reaction temperature utilized, catalyst system, and catalyst level. Generally, this reaction time will vary from about 20 minutes up to about 30 hours. Commonly, it will be preferred to utilize a reaction time from about 1 up to about 6 hours.

The amount of butadiene monomer that can be utilized in such a nonaqueous dispersion polymerization reaction mixture can be varied from about 3 to about 30 weight percent based upon the total reaction mixture. It is preferred to have a concentration of butadiene monomer ranging from 10 to 25 percent by weight based upon the total reaction mixture.

The amount of alkylbenzene sulfonic acid derivative (reaction product) that should be utilized in such a nonaqueous dispersion polymerization reaction mixture can be varied from about 0.02 phm to about 0.2 phm. The amount of polymeric dispersing agent that should be present in the polymerization reaction mixture can be varied from about 0.1 to about 4.0. phm.

It is desirable to conduct this polymerization in an oxygen and moisture free environment. For example, it is desirable to sparge the reaction mixture with dry nitrogen and to run the polymerization under a dry nitrogen atmosphere. The pressure in the reaction system during the polymerization generally will be a function of the polymerization temperature, the butadiene monomer concentration, and the boiling point of nonaqueous dispersion medium. This polymerization pressure will usually be within the range between 100,000 Pa (Pascal) and 500,000 Pa.

The catalyst systems used in this nonaqueous dispersion polymerization to prepare very high cis-1,4-polybutadiene are ternary systems comprised of an organoaluminum compound, a soluble nickel containing compound, and a fluorine containing compound. The organoaluminum compound used is usually a trialkylaluminum; a dialkylaluminum hydride, or a dialkylaluminum fluoride. The preferred organoaluminum compounds include triethylaluminum (TEAL), tri-n-propylaluminum, triisobutylaluminum (TIBAL), trihexylaluminum, disisobutylaluminum hydride (DIBA-H), and diethylaluminum fluoride. Some representative examples of organonickel compounds that can be utilized include nickel benzoate, nickel naphthenate, nickel 2-ethylhexanoate, which is commonly referred to as nickel octanoate or nickel octanoate (NiOct), nickel neo-decanoate, nickel acetylacetonate, and nickel salicylaldehyde. Some representative examples of fluorine containing compounds that can be utilized include boron trifluoride ($BF_3$), hydrogen fluoride, boron trifluoride diethyl etherate complex, boron trifluoride di-n-butyl etherate complex, boron trifluoride phenolate complex, boron trifluoride benzaldehyde complex, boron trifluoride ethyl benzoate complex, hydrogen fluoride diethylether complex, and hydrogen fluoride di-n-butyl ether complex.

The catalysts and the procedure for preparing very high cis-1,4-polybutadiene while utilizing nickel catalyst systems are described in U.S. Pat. Nos. 3,170,907, 3,483,177, 3,856,764. All of the foregoing references are hereby incorporated by reference in their entirety. The catalyst components can be charged "in situ," premixed in the absence of any monomer, "preformed" by premixing in the presence of a minor amount of butadiene monomer, or premixed in the presence of certain polymers such as polybutadiene.

This nonaqueous dispersion polymerization can be run by simply adding the catalyst components to a nonaqueous dispersion medium which contains butadiene monomer and the polymeric dispersing agent to form the reaction mixture. In a continuous polymerization process, all components are added simultaneously. During the course of the polymerization it will generally be desirable to provide some form of agitation to the reaction mixture, such as stirring, shaking, or tumbling. A shortstopping agent may be employed to terminate the polymerization after the desired reaction time or at the desired percent conversion of monomer to polymer. Antioxidants can also be added to these nonaqueous dispersions of very high cis-1,4-polybutadiene.

The nonaqueous dispersions formed in this polymerization process may have concentrations of very high cis-1,4-polybutadiene ranging between about 14 and 20 weight percent which are quite fluid and permit greatly improved heat transfer in comparison to that occurring with the very viscous, highly swollen polybutadiene cement of similar concentrations produced when using solution polymerization techniques. Due to the relative fluidity of these nonaqueous dispersions, the concentration of dispersed very high cis-1,4-polybutadiene in the medium can be increased by 25 to 60% over the maximum allowable concentrations in solution polymerization techniques. Thus, polymer concentrations prepared by the nonaqueous polymerization procedure may range between about 25 and about 35 weight percent. This is achieved while maintaining adequate fluidity and heat transfer. Therefore, the production capacity of a given polymerization reactor can be greatly increased. The viscosity of the nonaqueous dispersion will increase sharply as the concentration of very high cis-1,4-polybutadiene in the dispersion increases.

A further advantage of using this nonaqueous dispersion polymerization technique is that the polymerization medium can be recovered and used directly for further polymerizations without the usual steam stripping, distillation, and drying since the dispersed particles can be removed by centrifuging, sedimentation or filtration.

For example, a nonaqueous dispersion can be mixed with about 1 phr of di-tertiary-butyl-p-cresol and a trace of methanol (0.1 to 0.5% by weight) and then charged into a rotary drum vacuum filter where the bulk of the liquid nonaqueous dispersion medium can be removed and pumped to a premix makeup tank where fresh butadiene can be added for utilization in further polymerizations. The filter cake of very high cis-1,4-polybutadiene can then be removed mechanically and/or by using a reverse flow of an inert gas or nitrogen to help dislodge the polymer from the filter cloth. The drying of the filter cake can be completed by passing it through a tunnel dryer or an expeller and extruder dryer.

An alternative method of recovering the solid high cis-1,4-polybutadiene from the nonaqueous dispersion medium is by centrifuging. For example, an automatic batch centrifuge can be employed. Separation by sedimentation followed by removal (pumping off) of the supernatant liquid can also be used. However, this is generally a much slower and less effective process.

A portion of the liquid nonaqueous dispersion medium from either the filtration, centrifugation or sedimentation operations will generally have to be distilled in a fractionating column before it is returned to the premix makeup tank for use in additional polymerizations. This is in order to prevent buildup of excessive amounts of impurities in the recycled dispersion medium. Distillation of 15 to 25% by weight of the recycle medium normally will suffice although the amount will depend upon operating conditions.

Such a nonaqueous dispersion can also be processed in a manner similar to that customarily utilized in solution polymerization techniques, where the "cement" is mixed with water and steam which coagulate the polymer and vaporize the solvent and unreacted monomer. This is a very energy intensive process wherein water is removed from the "crumb" rubber in a dewatering tank and trough, a water expeller, and an extruder dryer. Several other variations in centrifuging, filtration and sedimentation operations are described by W. L. Mc-Cabe and J. C. Smith in *Unit Operations of Chemical Engineering*, Third Edition, McGraw-Hill Chemical Engineering Series, Chapter 30, pages 922–972 (1976). This article is incorporated herein by reference in its entirety.

DESCRIPTION OF THE PREFERRED EMBODIMENTS

This invention is illustrated by the following examples which are merely for the purpose of illustration and are not to be regarded as limiting the scope of the invention or manner in which it may be practiced. Unless specifically indicated otherwise, parts and percentages are given by weight. Inherent viscosities were determined at a concentration of 0.5 weight percent in toluene at 30° C.

Brookfield viscosities for the dispersions were determined at 25° C. using a Brookfield viscometer, Model LVF manufactured by Brookfield Laboratories, Inc. The very high cis-1,4-polybutadiene samples were separated from the nonaqueous media by air drying on drying trays followed by vacuum drying to constant weight (unless indicated otherwise).

The dispersions have been rated arbitrarily according to their relative appearance, that is, how well the polymer particles stay suspended and dispersed in the polymerization medium. The ratings expressed in a descending order of relative quality are; Excellent Very Good Good Fair Poor not a NAD (nonaqueous dispersion).

EXAMPLES 1 THROUGH 6

A solution of butadiene in hexane was prepared and passed down a column containing silica gel. Measured quantities of this solution were charged into a series of four ounce (118 ml) bottles. These solutions were well sparged with dry nitrogen after which time they contained about 9 grams of butadiene per 100 milliliters of solution (the solution contained 14.4 weight percent butadiene).

A very high cis-1,4-polyisoprene (Goodyear's Natsyn TM 200) was purified by dissolving it in toluene and then slowly coagulating it by pouring this polyisoprene in toluene solution into methanol. This removed most of the stopping agent, tetraethylene pentamine (TEPA), and the antioxidant from the polymer. Thus, analysis of the polymer before purification revealed that it contained 0.185 weight percent nitrogen whereas the purified polymer contained only 0.011 weight percent nitrogen. These percentages of nitrogen are equivalent to 0.50 and 0.03 weight percent of tetraethylene pentamine (TEPA). The small residual amount of TEPA in the purified polymer was ignored in subsequent use and calculations with this polymer.

The purified polyisoprene (IR) was dissolved in normal pentane to prepare a colloidal solution of IR. Aliquots of this IR solution were syringed into a series of six 118 ml bottles. Small amounts of dodecylbenzene sulfonic acid (DDBSA) and of tetraethylene pentamine (TEPA) were added to most of these bottles. The weight ratio of IR:DDBSA:TEPA can be determined by comparing columns 2, 3 and 4 in Table I. No DDBSA was added to one bottle and no TEPA was added to two bottles. The contents of these first two bottles were used as controls while the other bottles contained the codispersants which exhibited a synergistic dispersive action. All of the bottles containing the dispersants were placed on an Eberbach shaker and mixed for about 30 minutes at 25° C.

The contents of these bottles were syringed into a series of bottles containing the purified butadiene premix solution. The catalyst components triethylaluminum (TEAL), nickel octanoate (NiOct), and boron trifluoride dibutyl etherate complex then were injected "in situ" in that order at a catalyst level of 3, 0.1 and 5 millimoles per 100 grams of butadiene, respectively. The bottles were capped and tumbled end-over-end for 4 hours at 50° C. in a water bath. The results are summarized in Table I.

TABLE I

| Example Number | Dispersants, phm | | | Mole Ratio, DDBSA/TEPA | Dispersion | | | | Polymer Yield, Wt % |
|---|---|---|---|---|---|---|---|---|---|
| | Purified IR | DDBSA | TEPA | | Appearance | SN[1] | NAD[2] | SS[3] | |
| | | | | | | Volume % | | | |
| 1 | 4 | 0 | 0 | — | Fair | 10 | 73 | 17 | 85 |
| 2 | 4 | .031 | 0 | — | Fair | 24 | 63 | 13 | 85 |
| 3 | 4 | .0062 | .0036 | 1.0 | Very good | 14 | 85 | 1 | 88 |
| 4 | 4 | .0215 | .0036 | 3.5 | Very good | 6 | 83 | 11 | 88 |
| 5 | 4 | .031 | .0036 | 5.0 | Very good | 4 | 71 | 25 | 82 |

TABLE I-continued

| | Dispersants, phm | | | | Dispersion | | | | |
|---|---|---|---|---|---|---|---|---|---|
| Example Number | Purified IR | DDBSA | TEPA | Mole Ratio, DDBSA/TEPA | Appearance | Volume % | | | Polymer Yield, Wt % |
| | | | | | | SN[1] | NAD[2] | SS[3] | |
| 6 | 4 | .037 | .0036 | 6.0 | Good | 3 | 87 | 10 | 77 |

[1] SN = supernatant liquid.
[2] NAD = nonaqueous dispersion.
[3] SS = settled solids.

The relative quality of the nonaqueous dispersions (NAD's) was based not only upon the large volume percent of dispersion (NAD) after standing for 16 hours, but also upon the relative fluidity and the ease with which the particles which had settled could be redispersed. The appearance of the NAD's formed were rated on quality with excellent being better than very good which is better than good which is better than fair. Determinations were also made as to the percentage volume of nonaqueous dispersion (NAD), settled solids (SS) and supernatant liquids (SN) present in each bottle.

Examples 3 through 6 show that the presence of a small amount of the reaction product of DDBSA and TEPA greatly improve the quality of a nonaqueous dispersion.

EXAMPLES 7 THROUGH 9

A series of experiments were conducted using the procedure described in Examples 1 through 6, except that 4,7-diazadecane-1,10-diamine (DADDA) was used as the alkylene amine in place of TEPA and that the dodecylbenzene sulfonic acid and DADDA were allowed to react for one hour. The results of these experiments are summarized in Table II.

Examples 8 and 9 demonstrate that DADDA can be used as the polyalkylene amine in the preparation of the alkylbenzene sulfonic acid derivatives (reaction products) that are useful as codispersants in this invention.

(PPD) employed as a dispersant in the present examples was 2 phm. The proportion of DDBSA added was increased by small increments in this series of examples, and the NAD's formed were evaluated as described in Examples 1 through 6. The results are illustrated in Table III. These examples demonstrate that syndiotactic trans-1,2-polypentadiene can be effectively used together with the alkylbenzene sulfonic acid-tetraethylene pentamine reaction product as codispersants.

TABLE III

| | Dispersants, phm | | | | Dispersion | | | | |
|---|---|---|---|---|---|---|---|---|---|
| Example Number | Purified tr-1,2-PPD[1] | DDBSA | TEPA | Mole Ratio, DDBSA/TEPA | Appearance | Volume % | | | Polymer Yield, Wt % |
| | | | | | | SN | NAD | SS | |
| 10 | 2 | 0 | 0 | — | Good | 4 | 78 | 18 | 89 |
| 11 | 2 | 0.011 | 0.0018 | 3.5 | Good | 10 | 78 | 12 | 86 |
| 12 | 2 | 0.019 | 0.0018 | 6.0 | Good | 7 | 90 | 3 | 92 |
| 13 | 2 | 0.023 | 0.0018 | 7.5 | Very good | 4 | 95 | 1 | 88 |
| 14 | 2 | 0.031 | 0.0018 | 10 | Very good | 2 | 97 | 1 | 81 |

[1] tr-1,1-PPD = syndiotactic trans-1,2-polypentadiene

EXAMPLES 15 THROUGH 23

A purified butadiene in n-pentane premix solution containing 9 grams of butadiene per 100 milliliters of solution was prepared and charged into a series of 4 ounce (118 ml) bottles. The butadiene in these bottles of premix was polymerized after "in situ" addition of the dispersant and the catalyst component shown in Table IV. The dispersant used in Examples 20 and 21 was prepared by dissolving 4 grams of a synthetic very high cis 1,4-polyisoprene (Natsyn TM 200) in 95.5 mls of dry n-pentane in an 8 ounce (235 ml) bottle. The polyisoprene had not been purified and it contained abut 0.5 phr of tetraethylene pentamine (TEPA) which had been added to it as a stopping agent when the polymer was prepared. 0.21 grams of dodecylbenzene sulfonic acid (DDBSA) was added to the polyisoprene solution in the 235 ml bottle, which was then placed in a water bath controlled at 65° C., and then the bottle was tumbled end over end for 2 hours. Another codispersing agent

TABLE II

| | Dispersants, phm | | | | Dispersion | | |
|---|---|---|---|---|---|---|---|
| Example Number | Purified IR | DDBSA | | Mole Ratio, DDBSA/Amine | Appearance | Volume % | Polymer Yield, Wt % |
| | | | | | | NAD SS | |
| | | | TEPA | | | | |
| 7 | 4 | 0.031 | 0.0036 | 5.0 | Very good | 97   <1 | 64 |
| | | | DADDA | | | | |
| 8 | 4 | 0.024 | 0.0036 | 3.5 | Good | 94   3 | 70 |
| 9 | 4 | 0.041 | 0.0036 | 6.0 | Good | 94   3 | 60 |

EXAMPLES 10 THROUGH 14

A series of experiments were conducted using the procedure described in Examples 1 through 6 except that a different polymer, namely a syndiotactic trans-1,2-polypentadiene (about 88% trans-1,2-) was used in place of the very high cis-1,4-polyisoprene as the polymeric dispersing agent. The amount of polypentadiene was prepared for use in Example 19 by charging 150 mls of unpurified polyisoprene solution in n-pentane containing 6 grams of polyisoprene into an 8 ounce (235 ml) bottle. 0.078 grams of DDBSA in n-pentane was added to this bottle, which was then sealed and allowed to stand for 4 days.

The polymerization conditions for these examples were as follows: The catalyst components were triethylaluminum (TEAL), nickel octanoate (NiOct), and boron trifluoride dibutyletherate complex (BF$_3$.Bu$_2$O) with the catalyst level being 1, 0.05, and 1.8 millimoles per hundred grams of butadiene, respectively, with the exception that in Example 18, 50% more catalyst was used and that in Example 23, 200% more catalyst was used. Additional catalyst was used in Example 23 because the DDBSA inactivated the normal catalyst charge. The polymerization temperature that was employed was 50° C. and the polymerization time was 4 hours while turning end over end in a water bath. These polymerizations were terminated by injecting one phm of both a resin acid and a phenolic antioxidant as stabilizers. The bottles were allowed to stand overnight at room temperature and then the determinations were made as to the percent volume of nonaqueous dispersion (NAD), settled solids (SS) and supernatant liquids (SN) present in each bottle.

No dispersant was charged into Example 15 which was a control to demonstrate the poor results obtained in the absence of a dispersant. Examples 16 through 18 illustrate the necessity of having almost 8 phm of IR when it is used alone, in order to obtain a good nonaqueous dispersion. Examples 19 through 21 illustrate the present invention and are representative of the best mode for carrying it out, showing the improved quality of the nonaqueous dispersions formed in the presence of the codispersant. These Examples also illustrate the excellent NAD's that can be formed at low levels of polymeric dispersants when the reaction products of this invention are employed as codispersants. The Brookfield Viscosity of the nonaqueous dispersion formed in Example 20 was determined to be 3.5 centipoises (cps) using a number 3 spindle at 60 rpm at 25° C. For comparison, the Brookfield Viscosity for polybutadiene cements in hexane at comparable molecular weights and weight percent concentrations would be within the range between about 5,000 to 11,000 cps.

TABLE IV

| Example Number | Dispersants, phm Natsyn TM 200 | DDBSA | Mole Ratio, DDBSA/TEPA | Dispersion Appearance | Volume % NAD | SS | Polymer Yield, Wt % | DSV dl/g |
|---|---|---|---|---|---|---|---|---|
| 15 | 0 | 0 | 0 | Plated out | 0 | 20 | 97 | 3.3 |
| 16 | 2 | 0 | 0 | No NAD | 0 | 45 | 100 | ND[1] |
| 17 | 4 | 0 | 0 | Fair | — | — | 92 | 3.5 |
| 18 | 8 | 0 | 0 | Very good | 74 | 2 | 100 | 3.5 |
| 19 | 4 | 0.05 | 1.5 | Excellent | 86 | 1 | 88 | 3.1 |
| 20 | 2 | 0.1 | 5.7 | Excellent | 83 | 9 | 84 | 3.8 |
| 21 | 4 | 0.2 | 5.7 | Very good | ND[1] | ND | 91 | 4.2 |
| 22 | 0 | 0.2 | — | No NAD | 0 | 25 | 93 | 3.4 |
| 23 | 0 | 0.6 | — | No NAD | 0 | 47 | 84 | 3.3 |

[1]ND = not determined

While certain representative embodiments and details have been shown for the purpose of illustrating the invention it will be apparent to those skilled in this art that various changes and modifications may be made without departing from the scope of the invention.

What is claimed is:

1. A process for the nonaqueous dispersion polymerization of butadiene monomer in a reaction mixture containing a liquid nonaqueous dispersion medium, a catalyst system, butadiene monomer, and at least one polymeric dispersing agent, the improvement which comprises carrying out the polymerization of the butadiene monomer in the presence of the reaction product of (1) an alkylbenzene sulfonic acid wherein said alkyl moiety contains from 6 to 20 carbon atoms and (2) a polyalkylene amine that contains from 6 to 20 carbon atoms and 2 to 8 amine moieties.

2. A process for the nonaqueous dispersion polymerization of butadiene monomer into very high cis-1,4-polybutadiene in a reaction mixture containing a liquid nonaqueous dispersion medium and at least one polymeric dispersing agent selected from the group consisting of cis-1,4-poly(1,3-pentadiene), trans-1,4-poly(1,3-pentadiene), trans-1,2-poly(1,3-pentadiene), poly(2,3-dimethyl-1,3-butadiene), butadiene/isoprene copolymers, butadiene/dimethylbutadiene/pentadiene terpolymers, styrene/1,3-pentadiene copolymers, and mixtures of from 20% to 65% 3,4-polyisoprene and from 35% to 80% 1,4-polyisoprene, EPDM rubbers, butyl rubbers, high cis-1,4-polyisoprene, and carbonylated polymers, the improvement which comprises carrying out the polymerization of the butadiene monomer in the presence of at least one alkylbenzene sulfonic acid derivative which is the reaction product of (1) an alkylbenzene sulfonic acid wherein said alkyl moiety contains from 6 to 20 carbon atoms and (2) a polyalkylene amine that contains from 6 to 20 carbon atoms and from 2 to 8 amine moieties.

3. A process as specified in claim 1 wherein said alkylbenzene sulfonic acid is dodecylbenzene sulfonic acid.

4. A process as specified in claim 2 wherein said alkylbenzene sulfonic acid is dodecylbenzene sulfonic acid.

5. A process as specified in claim 1 wherein said polyalkylene amine is at least one member selected from the group consisting of diethylene triamine, triethylene tetramine, tetraethylene pentamine, pentaethylene hexamine, propylene diamine, tripropylene tetramine, 4,7-diazadecane-1,10-diamine, and 3-azahexane-1,6-diamine.

6. A process as specified in claim 2 wherein said polyalkylene amine is at least one member selected from the group consisting of diethylene triamine, triethylene tetramine, tetraethylene pentamine, pentaethylene hexamine, propylene diamine, tripropylene tetramine, 4,7-diazadecane-1,10-diamine, and 3-azahexane-1,6-diamine.

7. A process as specified in claim 1 wherein said polyalkylene amine is tetraethylene pentamine.

8. A process as specified in claim 2 wherein said polyalkylene amine is tetraethylene pentamine.

9. A process as specified in claim 1 wherein said polyalkylene amine is 4,7-diazadecane-1,10-diamine.

10. A process as specified in claim 2 wherein said polyalkylene amine is 4,7-diazadecane-1,10-diamine.

11. A process as specified in claim 1 wherein the molar ratio of said alkylbenzene sulfonic acid to said polyalkylene amine employed in the preparation of said reaction product is 0.5:1 to 20:1.

12. A process as specified in claim 2 wherein the molar ratio of said alkylbenzene sulfonic acid to said polyalkylene amine employed in the preparation of said reaction product is 0.5:1 to 20:1.

13. A process as specified in claim 1 wherein the molar ratio of said alkylbenzene sulfonic acid to said polyalkylene amine employed in the preparation of said reaction product is 1:1 to 10:1.

14. A process as specified in claim 2 wherein the molar ratio of said alkylbenzene sulfonic acid to said polyalkylene amine employed in the preparation of said reaction product is 1:1 to 10:1.

15. A process as specified in claim 1 wherein said polymeric dispersing agent is high cis 1,4-polyisoprene.

16. A process as specified in claim 2 wherein said polymeric dispersing agent is high cis-1,4-polyisoprene.

17. A process as specified in claim 1 wherein said polymeric dispersing agent is syndiotactic trans-1,2-polypentadiene.

18. A process as specified in claim 2 wherein said polymeric dispersing agent is syndiotactic trans-1,2-polypentadiene.

* * * * *